US010963641B2

(12) United States Patent
Saetrom et al.

(10) Patent No.: US 10,963,641 B2
(45) Date of Patent: Mar. 30, 2021

(54) MULTI-LINGUAL TOKENIZATION OF DOCUMENTS AND ASSOCIATED QUERIES

(71) Applicant: Microsoft Technology Licensing, LLC, Redmond, WA (US)

(72) Inventors: Ola Saetrom, Oslo (NO); Liang Zheng, Oslo (NO); Wei Wei, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 38 days.

(21) Appl. No.: 15/625,432

(22) Filed: Jun. 16, 2017

(65) Prior Publication Data

US 2018/0365207 A1 Dec. 20, 2018

(51) Int. Cl.
*G06F 40/284* (2020.01)
*G06F 40/117* (2020.01)
*G06F 40/263* (2020.01)
*G06F 40/126* (2020.01)

(52) U.S. Cl.
CPC .......... *G06F 40/284* (2020.01); *G06F 40/117* (2020.01); *G06F 40/263* (2020.01); *G06F 40/126* (2020.01)

(58) Field of Classification Search
CPC .... G06F 17/277; G06F 40/284; G06F 40/126; G06F 40/263
See application file for complete search history.

(56) References Cited

U.S. PATENT DOCUMENTS

| | | | | |
|---|---|---|---|---|
| 5,721,939 A * | 2/1998 | Kaplan | ............. | G06F 40/284 |
| | | | | 704/9 |
| 5,890,103 A | 3/1999 | Carus | | |
| 6,542,888 B2 * | 4/2003 | Marques | ............. | G06F 17/27 |
| 7,092,871 B2 * | 8/2006 | Pentheroudakis | .... | G06F 40/226 |
| | | | | 704/9 |
| 7,174,290 B2 * | 2/2007 | Loofbourrow | ...... | G06F 16/3335 |
| | | | | 704/9 |
| 8,862,458 B2 | 10/2014 | Freising et al. | | |
| 2002/0073079 A1 | 6/2002 | Terheggen | | |
| 2012/0203540 A1 * | 8/2012 | Aue | ............. | G06F 17/275 |
| | | | | 704/8 |
| 2012/0317136 A1 | 12/2012 | Papish et al. | | |
| 2013/0179147 A1 * | 7/2013 | Alkharashi | ........ | G06F 40/284 |
| | | | | 704/8 |
| 2013/0191111 A1 * | 7/2013 | Goswami | ............. | G06F 40/58 |
| | | | | 704/8 |

OTHER PUBLICATIONS

"Splunk Enterprise Dashboards and Visualizations", http://docs.splunk.com/Documentation/Splunk/6.5.3/Viz/tokens, Retrieved on: May 11, 2017, pp. 1-25.

(Continued)

*Primary Examiner* — Feng-Tzer Tzeng
(74) *Attorney, Agent, or Firm* — Shook, Hardy & Bacon, LLP

(57) ABSTRACT

Described herein is a content management system that tokenizes and stores documents using a number of different tokenization settings or schemes. These tokenization settings help ensure that documents, and content associated with the documents, are tokenized in a similar manner regardless of the language of the content contained within the document.

20 Claims, 10 Drawing Sheets

(56) References Cited

OTHER PUBLICATIONS

"Active Filtering", http://cliffoutdoors.com/lr_v21/admin/docs/filter.htm, Retrieved on: May 11, 2017, 4 pages.
"Tokenizers", https://cwiki.apache.org/confluence/display/solr/Tokenizers, Retrieved on: May 16, 2017, 13 pages.
"Elastic", https://www.elastic.co/guide/en/elasticsearch/reference/current/analysis-tokenizers.html, Retrieved on: May 16, 2017, 5 pages.

* cited by examiner

MULTI-LINGUAL TOKENIZATION OF DOCUMENTS AND ASSOCIATED QUERIES

BACKGROUND

A document to be stored in a content management system may include content in multiple languages. For example, the first part of the document may be in English, a second part of the document may be in Japanese, and a third part of the document may be in Chinese and so on. However, current content management systems are only able to tokenize the document using a single language (e.g., English). Thus, when this document is tokenized, the content that is not in English may be excluded from the tokenization or may be tokenized using an English language tokenization scheme. However, when an English language tokenization scheme is used on different languages, content in the different languages may not be tokenized the same way across all other documents containing the different languages and in a way that is consistent with a query. Thus, when a search is performed, this particular document may not be found due to the non-consistent way the non-English languages within the document were tokenized with the English language tokenization scheme.

Additionally, a document in a content management system may also be associated with various metadata fields. These metadata fields may also include content in different languages. In other cases, the metadata fields may include or contain symbols, numbers and/or punctuation that is specific to a particular language. The metadata fields associated with the document may also be tokenized using a tokenization scheme that does not recognize these symbols, numbers and/or punctuation. As such, these metadata fields may be tokenized in a non-consistent manner across a number of different documents. In such cases, when a search is performed, this document may not be found due to the non-consistency of the tokenization scheme.

It is with respect to these and other general considerations that examples have been described. Also, although relatively specific problems have been discussed, it should be understood that the examples should not be limited to solving the specific problems identified in the background.

SUMMARY

This disclosure generally relates to a system and method for tokenizing documents based on various tokenization settings. These tokenization settings include a setting for tokenizing content associated with the document in a language neutral way, tokenizing content associated with the document in which one or more substrings of the content associated with the document are tokenized, and tokenizing subsections of the document based on a detected language of each subsection.

Accordingly, described herein is a method for tokenizing a document comprising receiving a document and analyzing the document to determine one or more languages of text contained within the document. Once the one or more languages are detected, one or more subsections of the document are identified based, at least in part, on the determined one or more languages. Each of the one or more subsections are then tokenized based, at least in part, on the determined one or more languages and the tokenized document is stored in a content management system.

Also described is a system, comprising one or more processors and a memory coupled to the one or more processors and storing instructions which, when executed by the one or more processors, causes the one or more processors to perform a method. This method includes receiving a document to be stored in a content management system and receiving input that indicates one or more of a plurality of different tokenization settings to be applied to content associated with the document. In some cases, the plurality of different tokenization settings include a first setting that tokenizes a subpart of content associated with the document, a second setting that tokenizes the content associated with the document in a language neutral manner, and a third setting that tokenizes subsections of the content associated with the document in a language specific manner. The content associated with the document is tokenized based, at least in part, on the received input. The document is then stored in a content management system.

The present disclosure also describes a method for tokenizing a document and includes receiving the document and receiving input that indicates one or more of a plurality of different tokenization settings to be applied to content associated with the document. The plurality of different tokenization settings include a first setting that tokenizes a subpart of content associated with the document, a second setting that tokenizes the content associated with the document in a language neutral manner, and a third setting that tokenizes subsections of the content associated with the document in a language specific manner. The content associated with the document is then tokenized based, at least in part, on the received input and the tokenized document is stored in the content management system. In response to a received query, and when the query is tokenized using at least one of the plurality of different tokenization settings, the tokenized document may be received.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

This disclosure describes a content management system that tokenizes and stores documents using a number of different tokenization settings or schemes. These tokenization settings help ensure that documents within a content management system, and content associated with the documents, are tokenized in a similar manner regardless of the language of the content contained within the document. In some cases, the content management system may be a document management and storage system and/or a collaborative workspace environment that enables documents to be created, shared, and edited by various individuals associated with an organization.

In some examples, the content management system may include a user interface that enables an individual to select or otherwise identify a document that is to be stored in the content management system. The user interface also enables an individual to select one or more different tokenization settings that is applied to the document—regardless of the language of the content within the document and/or the language of one or more metadata fields associated with the document. Once the tokenization setting is selected, the body of the document and/or one or more metadata fields associated with the document, will be tokenized using the selected tokenization setting. In some cases, multiple tokenization settings may be selected and each tokenization setting may be applied to a single document.

Once the document and/or the metadata fields associated with the document are tokenized, the document may be stored and/or indexed by the content management system. When a query is subsequently received, the query may be tokenized using the same tokenization settings. As a result, the tokenized query may be more effective in finding and retrieving relevant documents since the content of the documents, and the query, are tokenized in a consistent manner.

These and other examples will be described in more detail below with respect to FIGS. 1-4.

Figure 1A:
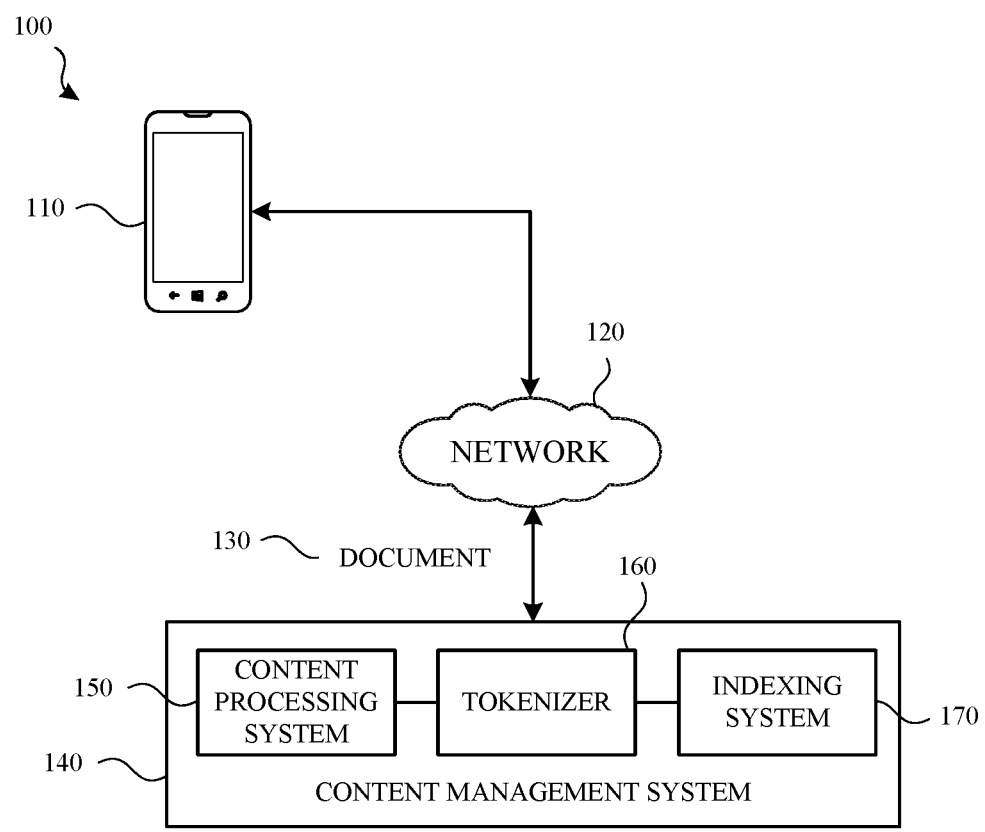
FIG. 1A illustrates a system for tokenizing a document that is stored in a content management system according to an example.

FIG. 1A illustrates an example system 100 for tokenizing and storing documents according to an example. As will be explained, the system 100 may allow an individual to access a content management system, select one or more tokenization settings for a document and/or for content associated with the document, tokenize the document, and store the document in the content management system.

For example, an individual may utilize a computing device, such as, for example, computing device 110, to access a content management system 140. The computing device 110 may be any computing device capable of connecting to the content management system 140 over a network 120. Example computing devices include, but are not limited to, a mobile telephone, a smart phone, a tablet, a phablet, a smart watch, a wearable computer, a personal computer, a desktop computer, a laptop computer, a gaming device/computer (e.g., Xbox®), and the like.

The computing device 110 may enable the individual to access, edit and/or create a document 130. The document 130 may be stored within the content management system 140, created by the content management system 140, or it may be created locally on the computing device 110 and subsequently stored by the content management system 140.

The document 130 may be any document that includes some form of content or other data. Example documents include word processing documents, spreadsheet documents, portable document format documents and so on. The content contained within the document 130 or otherwise associated with the document 130 may be text content including characters, numbers, letters, symbols, punctuation, and so on. In some cases, the content may also include images, sounds, videos and so on. The content of the document 130 may be in a single language (e.g., English) or in multiple languages (e.g., English, Japanese, Korean, Chinese, German, etc.).

The document 130 may also be associated with one or more metadata fields. The metadata fields, and the content contained in the metadata fields, may be automatically generated (e.g., by the computing device 110 that created, edited or otherwise accesses the document 130) or may be created by an individual. The metadata fields may provide a semantic meaning for the particular document 130. Example metadata fields include a body of the document 130, a title of the document 130, a globally unique identifier of the document 130, a serial number of the document 130, an author of the document 130 and the like.

In some cases, the metadata fields associated with the document 130 may contain multi-lingual natural language content while other metadata fields contain machine generated data. Regardless of the format of the content in the various metadata fields, the content management system 140 of the present disclosure may tokenize the content in a uniform manner and based on one or more tokenization settings.

Once the document 130 and/or the content associated with the document (e.g., the content contained within the metadata fields) has been created, the document 130 may be provided to the content management system 140. In some cases, the document 130 may be created, edited or otherwise accessed directly within the content management system 140. For example, the computing device 110 may access the content management system 140 over a network 120 and edit the document 130 and/or one or more metadata fields associated with the document 130.

In some cases, the content management system 140 may provide a user interface for the computing device 110 that enables an individual to locate a particular document 130, create a document 130 and/or edit the content of the document 130. Once the content for the document 130 has been created and/or edited, the user interface may allow an individual to select one or more tokenization settings to be applied to the document 130.

During a tokenization process, a tokenizer (e.g., tokenizer 160) identifies sequences of characters that make up words and elements (e.g., punctuation). These sequences of characters are then represented by numeric codes or tokens. Each token may include information about various characteristics of the original sequence of characters such as, for example, the case of each character (e.g., whether the character is an uppercase character, a lower case character, whether a string of characters contain both uppercase and lowercase characters etc.), the language of the character or sequence of characters, lexical category of each character or sequence of characters (e.g., the part of speech such as, for example, whether the sequence of characters is a noun or a verb), a position of each character or sequence of characters, a sentence number, a position of the sentence, a length of the sequence of characters, a line number of the character or sequence of characters and the like.

However, and as described above, the content within the various metadata fields or within the document itself may be provided in different languages. In other cases, the metadata fields may include content that is not recognizable by a particular tokenization scheme. For example, a Japanese tokenizer may not recognize English punctuation or numbers. Likewise, an English tokenization scheme may not recognize Japanese characters. Thus, a particular tokenization scheme may tokenize the same or similar words in different ways across different documents.

In yet other cases, one or more metadata fields may include a string of numbers and characters that cannot be parsed into smaller subparts by a standard tokenizer. Accordingly, the content management system of the present disclosure introduces additional tokenization settings that are used to tokenize content associated with the document 130 in a number of different ways.

In the first example, the content management system 140 may utilize a language neutral tokenization setting. In this setting, the content management system 140 may tokenize the content of certain metadata fields associated with the document in a language neutral way. Thus, content of certain metadata fields associated with the document may be tokenized using the same scheme (e.g., using an English based tokenizer) regardless of the detected language of the primary content of the document (e.g., body).

For example, when the document 130 is provided to the content management system 140, a content processing system 150 parses the document 130 and determines a primary language of the content associated with the document 130. In current content management systems, the document 130 is subsequently tokenized based on the detected language. However, if the document 130 contains multiple languages, the tokenization may be inconsistent across various documents 130 that include multiple languages.

However, in the instant case, when the document 130 is provided to the content management system 140, the content processing system 150 may detect the language or the languages of the content associated with the document 130. However, the tokenizer 160 may tokenize the document 130 using a tokenization scheme that is separate and independent from the detected language or languages of the content associated with the document 130. Thus, for all documents 130 (including one or more metadata fields associated with the document) that include the detected language, the content is tokenized using the same scheme.

For example, if the document 130 includes content (e.g., content in the document itself and/or content in one or more metadata fields) that is in English, Spanish and Japanese, all of the content associated with the document 130 may be tokenized using a language neutral tokenizer. Thus, as other documents that contain content (e.g., content in the document itself and/or content in one or more metadata fields) in English, Spanish and/or Japanese are tokenized, that content is tokenized using the same language neutral tokenization scheme. As such, the tokenization between various documents remains consistent. Once the content associated with the document 130 is tokenized by the tokenizer, an indexing system 170 associated with the content management system 140 indexes or otherwise stores the document 130 for subsequent queries.

The user interface may also provide a second tokenization setting referred to as finer query tokenization setting. In this tokenization setting, content contained within a metadata field is broken into various substrings. In such cases, a string of characters may be broken down or otherwise tokenized into as may substrings as possible.

For example, if a metadata field included the string "1-23-456#7" as an identifier, the finer query tokenization setting may generate a token for each substring. For example, the string may be broken down into the following substrings: 1, 1-, 1-2, 1-23, 1-23-, 1-23-4 and so on. Further, each of these substrings may be tokenized in a language specific manner or a language neutral manner such as described above. Once the content associated with the document has been tokenized using this tokenization setting, the document is indexed and/or otherwise stored by the indexing system 170. As a result of the finer query tokenization setting, a query containing a token 1, or 1-23 may return the document with the 1-23-456#7 identifier.

In another example, the content management system 140 may enable an individual to select a section based tokenization setting from the user interface. The section based tokenization setting enables different subsections of the content associated with the document to be tokenized in a number of different languages.

For example, the document 130 may include content in which one paragraph in a body of the document 130 is in English, a second paragraph in the body of the document 130 in in Japanese and a third paragraph in the body of the document 130 is in Chinese. In such cases, and when the section based tokenization setting is selected, the content processing system 150 of the content management system 140 analyzes each subsection of the document 130, determines the language of each subsection and annotates each subsection with the determined language.

In some cases, the content processing system 150 may annotate each subsection with the detected language regardless of the size of the subsection. For example, the subsection may include multiple pages, a single page, multiple paragraphs, a single paragraph, multiple sentences, a single sentence, multiple words, a single word and so on.

Once the different subsections of the document 130 have been annotated, the document 130 is provided to the tokenizer 160 that tokenizes each subsection based on the detected language. For example, the tokenizer 160 may use the annotation to determine the detected language of a particular subsection and use a tokenization scheme that matches or otherwise corresponds to the detected language.

Once the document 130 has been tokenized, the document 130 is provided to the indexing system 170 that indexes or otherwise stores the document 130 in the content management system 140 for subsequent retrieval.

Although specific tokenization settings are mentioned, the content management system 140 may support additional types of tokenization settings including an option to not tokenize content associated with the document 130 or tokenize the content associated with the document 130 in a primary language detected by the content processing system 150.

In some cases, one or more of the tokenization settings may be combined and the content associated with the document may be tokenized using two different settings. For example, the finer query tokenization setting may be combined with the language neutral tokenization setting.

Although a specific example is given, other tokenization settings may be combined based on received input.

Figure 1B:
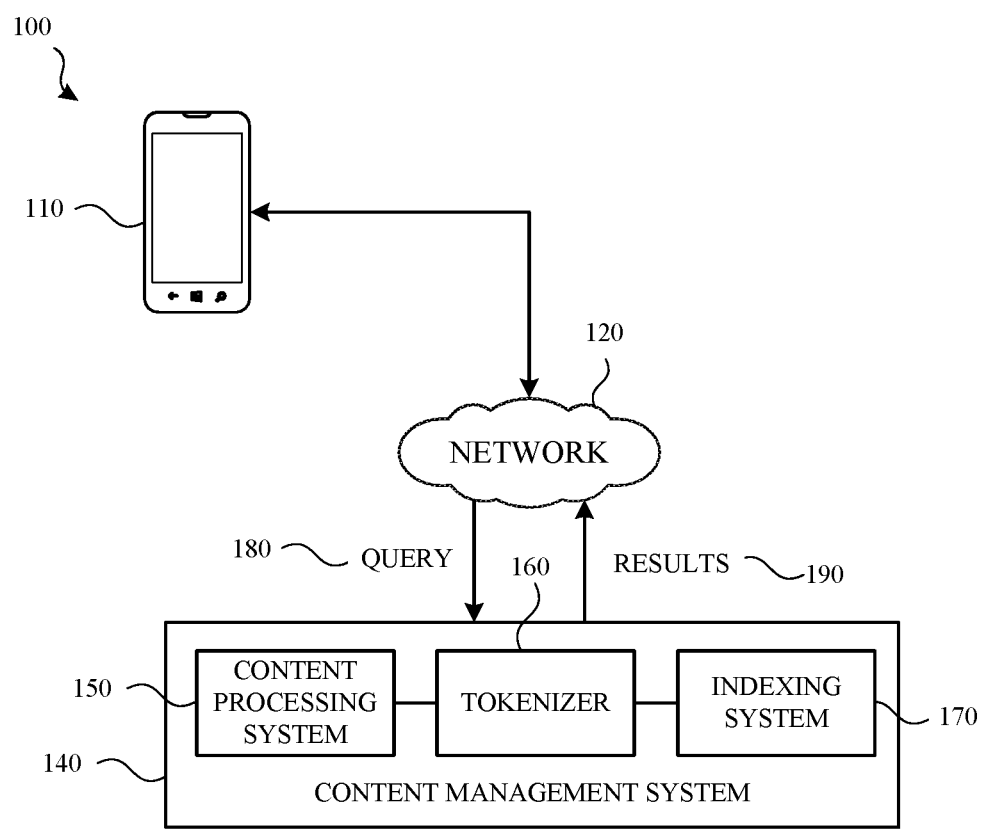
FIG. 1B illustrates the system of FIG. 1A in which a query is tokenized and in which the query is used to find one or more tokenized documents that are stored in the content management system according to an example.

FIG. 1B illustrates the system 100 shown in FIG. 1A in which a query 180 is tokenized and subsequently used to find one or more tokenized documents that are stored in the content management system 140 according to an example.

As shown in FIG. 1B, an individual may access a user interface on a computing device 110 to submit a query 180 to the content management system 140. The query 180 may be in a language that is familiar to or otherwise spoken by the individual. For example, if the individual submitting the query 180 speaks English, the query 180 may be provided in English text. In other cases, if the individual speaks Japanese, the query 180 may be provided in Japanese characters. In yet other cases, the query 180 may be spoken or otherwise provided to the content management system 140.

Once the query 180 is submitted, the individual may select one or more of the tokenization settings described above. Once the tokenization setting is selected, the query 180 may be tokenized based on the setting. For example, if the individual selects the finer query tokenization setting, the query 180 may be tokenized such that each substring of the query string is tokenized and used to find one or more matching documents.

In some cases, once the query 180 is received, the content processing system 150 may analyze the query 180 to determine one or more properties of the query 180. For example, the content processing system 150 may determine which metadata field the query 180 is associated with, the language of the query 180, whether the query 180 contains one or more symbols, punctuation and so on.

The query 180 may then be provided to the tokenizer 160 that tokenizes it based on the received tokenization setting. The tokenized query is then provided to the indexing system 170 to find one or more documents that have content (e.g., content in the metadata fields) that match the tokenized query. The results 190 may then be provided to the user interface provided on the computing device 110.

Figure 2:
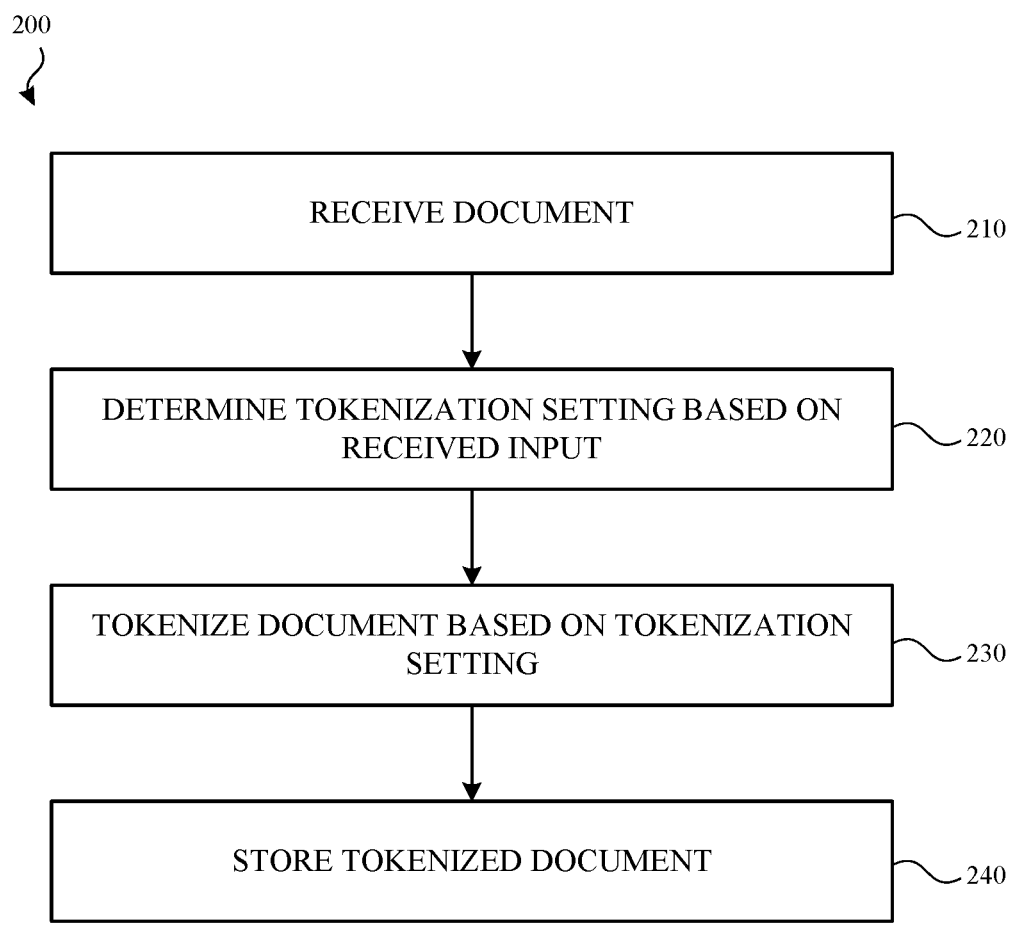
FIG. 2 illustrates a method for tokenizing a document according to an example.

FIG. 2 illustrates a method for tokenizing a document according to an example. The method 200 may be used by a system, such as, for example the system 100 described above with respect to FIG. 1A to tokenize a document based on received input that specifies one or more tokenization settings.

Method 200 begins at operation 210 in which a document is received by a content management system, such as, for example, the content management system 140 shown in FIG. 1A. Although operation 210 specifies that document is received by the content management system, it is contemplated that the document management system may host the document, create the document or otherwise enable an individual to access the document either on a local computing device or over a network connection.

Once the document has been received, created or otherwise accessed, content may be provided to the document. For example, an individual may add content to the document and/or add one or more metadata fields to the document. In some cases, the document management system may also add one or more metadata fields to the document. In some examples, the metadata fields may include a globally unique identifier, a serial number, a document identifier and so on.

Flow then proceeds to operation 220 and a tokenization property of the document is determined. In some cases, the tokenization property is based, at least in part, on received input. For example, the content management system may generate or otherwise provide a user interface on a computing device that enables and individual to select one or more tokenization properties that will be applied to the content associated with the document.

In other cases, the content management system may automatically determine how to tokenize the content associated with the document. For example, the content management system may determine that the content associated with the document includes multiple languages. As such, the content management system may automatically apply a language neutral tokenization setting. In other cases, the content management system may automatically apply a section based tokenization setting when multiple languages are detected. In some cases, the content management system may determine which tokenization setting should be used on a particular metadata field based on previously received input.

For example, if a document having one or more metadata fields with specific content (e.g., author) is tokenized using a particular tokenization setting (or settings) and a second document is received that includes similar content in similar metadata fields, the content management system may determine that the second document should be tokenized using a tokenization setting similar to the tokenization settings used on the first document. As such, the same tokenization setting or settings will be applied to the second document.

Flow then proceeds to operation 230 and the content associated with the document is tokenized based on the determined tokenization setting (or settings). Flow then proceeds to operation 240 and the document is stored by the content management system.

Figure 3:
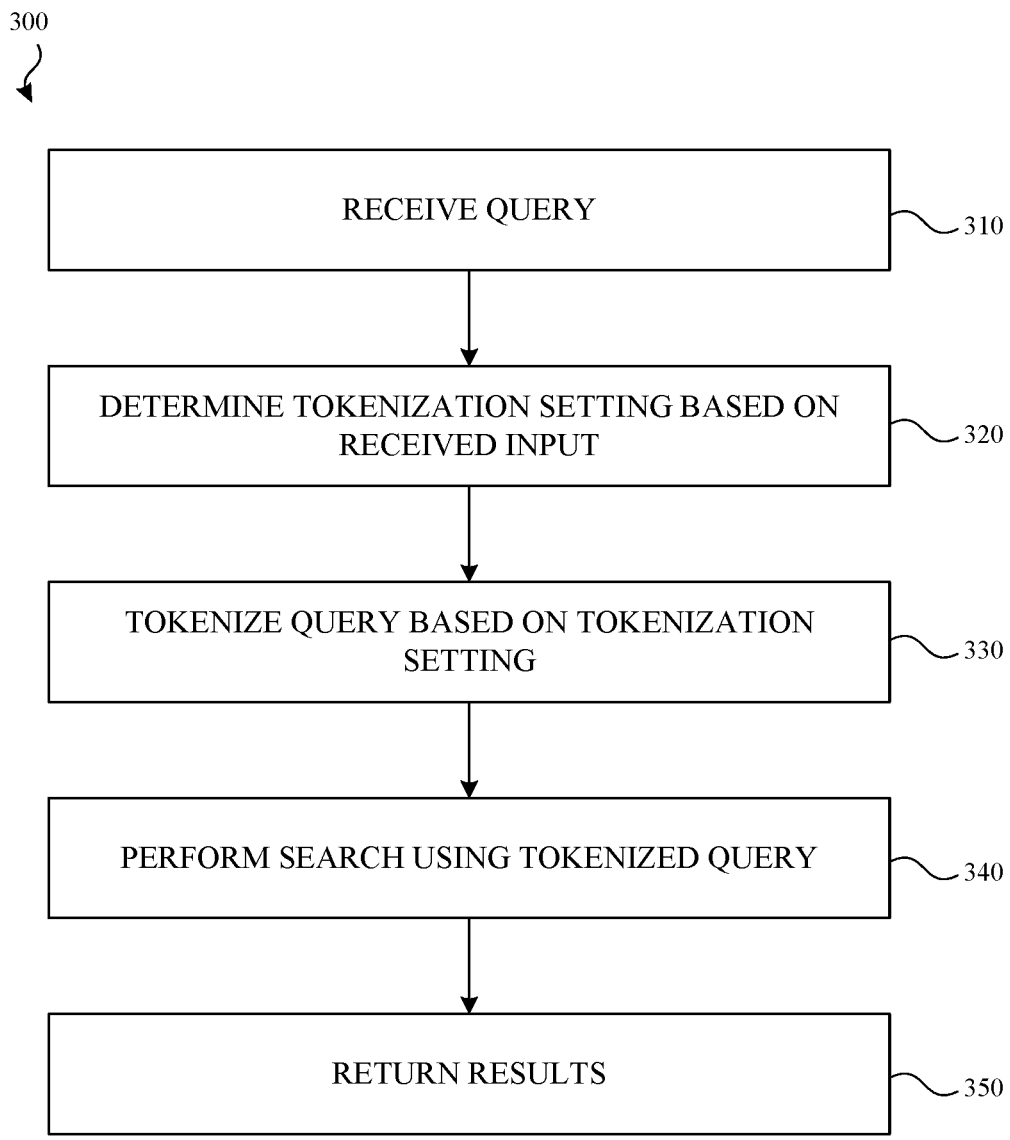
FIG. 3 illustrates a method for tokenizing a query according to an example.

FIG. 3 illustrates a method 300 for tokenizing a query according to an example. The method 300 may be used by a system, such as, for example the system 100 described above with respect to FIG. 1B.

Method 300 begins at operation 310 in which a query is received by a content management system such as, for example, content management system 140 shown in FIG. 1B. In some examples, the query may be provided in a user interface of a computing device.

Once the query is received, flow proceeds to operation 320 and a tokenization setting of the query is determined. In some cases, the tokenization setting is determined based on received input. For example, the user interface may provide a list of tokenization settings that may be selected by an individual.

In other cases, the tokenization setting of the query may be automatically determined by the content management system. For example, the content management system may determine that a majority of the documents that have been stored in the content management system have been tokenized using a particular tokenization setting. As such, the query may be automatically tokenized using the same tokenization setting.

In another example, the query may be associated with a specific metadata field of the document (e.g., a body of the document). The content management system may determine that past queries on the specified metadata field have been tokenized using a particular tokenization setting (e.g., section based tokenization setting) and as such, the query should be tokenized using the same tokenization setting.

Flow then proceeds to operation 330 and the query is tokenized based on the tokenization setting. In operation 340, a search is performed using the tokenized query and one or more results are returned in operation 350.

Figure 4:
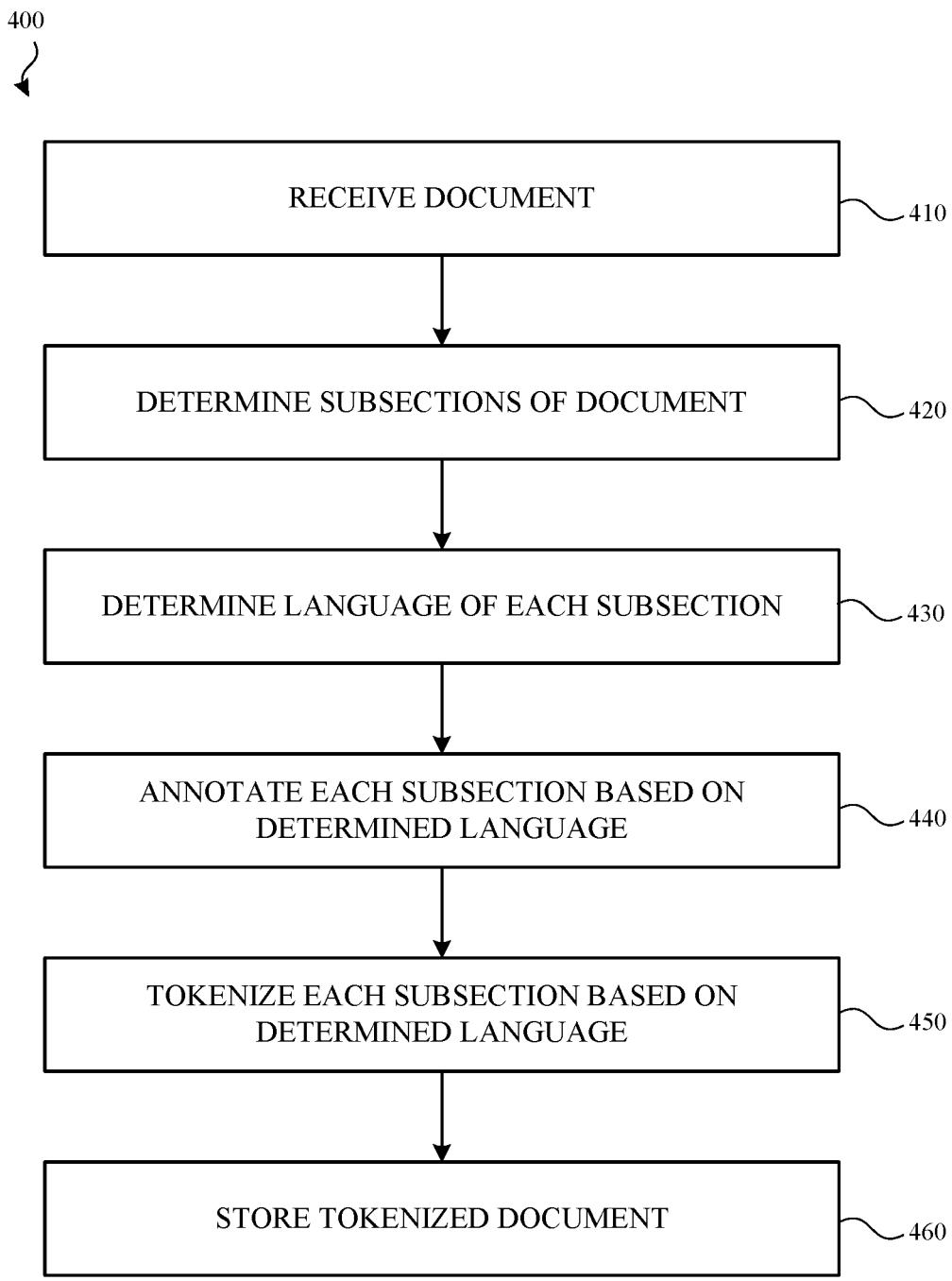
FIG. 4 illustrates a method for tokenizing a document that includes content in multiple languages according to an example.

FIG. 4 illustrates a method 400 for tokenizing a document that includes content in multiple languages according to an example. The method 400 may be used by a content management system, such as, for example, content management system 140 shown above with respect to FIG. 1A. In some cases, the method 400 may be used to perform a section based tokenization of content associated with a document.

Method 400 begins at operation 410 in which a document is received. In some cases and as described above, although receipt of document is specifically mentioned, operation 410 encompasses cases in which a document is created or generated by, provided to or accessed from a content management system.

Once the document is received, flow proceeds to operation 420 and the document is analyzed to determine one or more subsections of the document. In some cases, a content processing system of the content management system may be used to determine the various subsections of the document.

Flow then proceeds to operation 430 and the language of each subsection is determined. For example, the content of the document may be analyzed by the content processing system to determine a language of the content. Although the language determination is shown as occurring after the subsection determination operation, these two operations may occur in reverse or may occur simultaneously or substantially simultaneously.

In operation 440, each subsection of the document is annotated with an indication about the language of each subsection. For example, if a first paragraph in the body of the document is in English, the annotation will specify that this subsection should be tokenized using an English tokenization scheme. Likewise, if a second paragraph in the body of the document is in Japanese, the annotation will specify that this subsection should be tokenized using a Japanese tokenization scheme.

Flow then proceeds to operation 450 and each subsection is tokenized using the tokenization scheme specified by the annotation. In operation 460, the tokenized document is stored such as described above.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of electronic device configurations that may be utilized for practicing aspects of the disclosure, as described herein.

Figure 5:
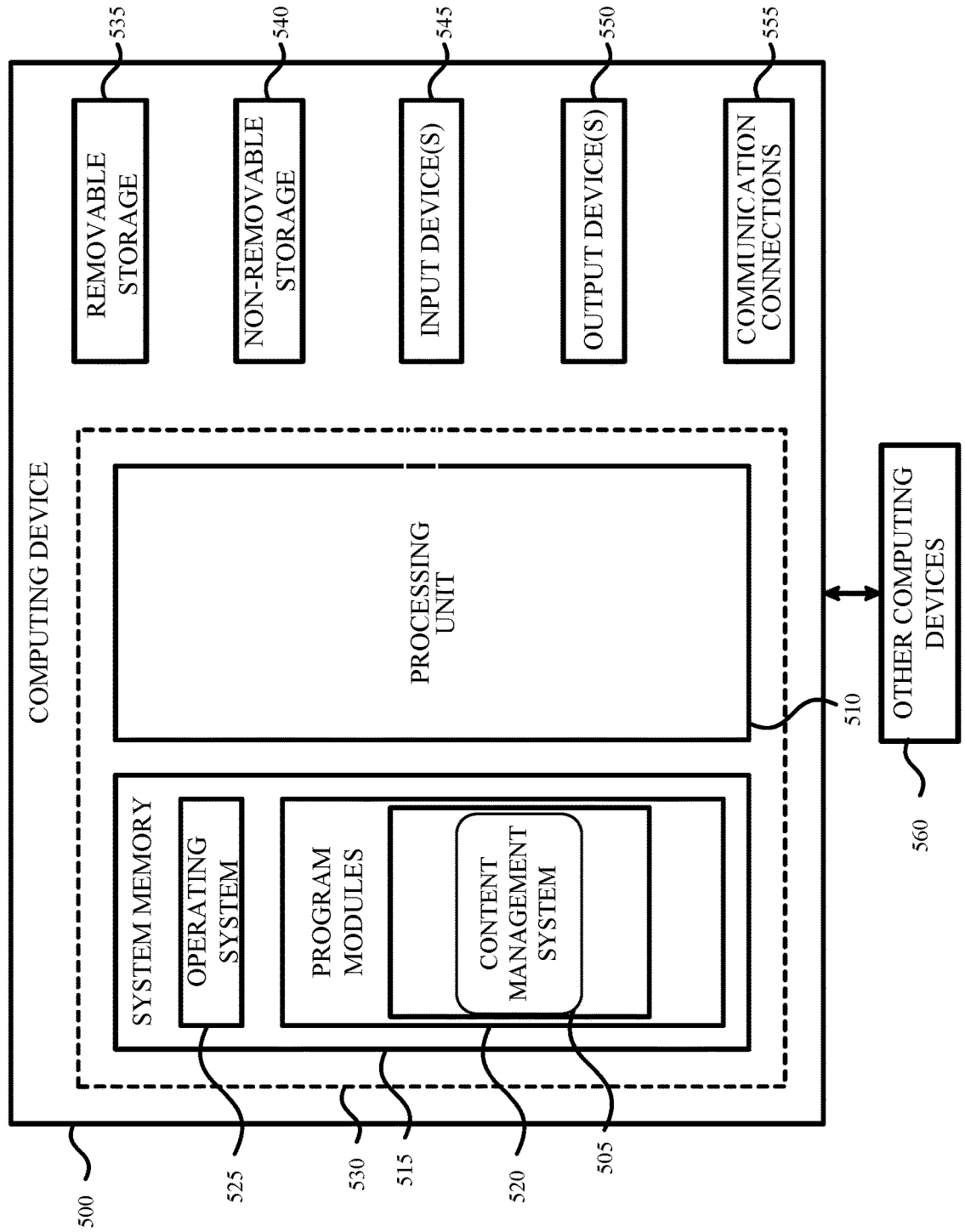
FIG. 5 is a block diagram illustrating example physical components of a computing device with which aspects of the disclosure may be practiced.

FIG. 5 is a block diagram illustrating physical components (e.g., hardware) of an electronic device 500 with which aspects of the disclosure may be practiced. The components of the electronic device 500 described below may have computer executable instructions for causing a code correction component 505 to feedback about received code submissions such as described above.

In a basic configuration, the electronic device 500 may include at least one processing unit 510 and a system memory 515. Depending on the configuration and type of electronic device, the system memory 515 may comprise, but is not limited to, volatile storage (e.g., random access memory), non-volatile storage (e.g., read-only memory), flash memory, or any combination of such memories. The system memory 515 may include an operating system 525 and one or more program modules 520 such as a content management system 505 (or one or more subsystems of the content management system) such as described herein.

The operating system 525, for example, may be suitable for controlling the operation of the electronic device 500. Furthermore, examples of the disclosure may be practiced in conjunction with a graphics library, other operating systems, or any other application program and is not limited to any particular application or system. This basic configuration is illustrated in FIG. 5 by those components within a dashed line 530.

The electronic device 500 may have additional features or functionality. For example, the electronic device 500 may also include additional data storage devices (removable and/or non-removable) such as, for example, magnetic disks, optical disks, or tape. Such additional storage is illustrated in FIG. 5 by a removable storage device 535 and a non-removable storage device 540.

As stated above, a number of program modules and data files may be stored in the system memory 515. While executing on the processing unit 510, the program modules 520 may perform processes including, but not limited to, the aspects, as described herein.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of client to switch protocols may be operated via application-specific logic integrated with other components of the electronic device 500 on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, examples of the disclosure may be practiced within a general purpose computer or in any other circuits or systems.

The electronic device 500 may also have one or more input device(s) 545 such as a keyboard, a trackpad, a mouse, a pen, a sound or voice input device, a touch, force and/or swipe input device, etc. The output device(s) 550 such as a display, speakers, a printer, etc. may also be included. The aforementioned devices are examples and others may be used. The electronic device 500 may include one or more communication connections 555 allowing communications with other electronic devices 560. Examples of suitable communication connections 555 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 515, the removable storage device 535, and the non-removable storage device 540 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 500. Any such computer storage media may be part of the electronic device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
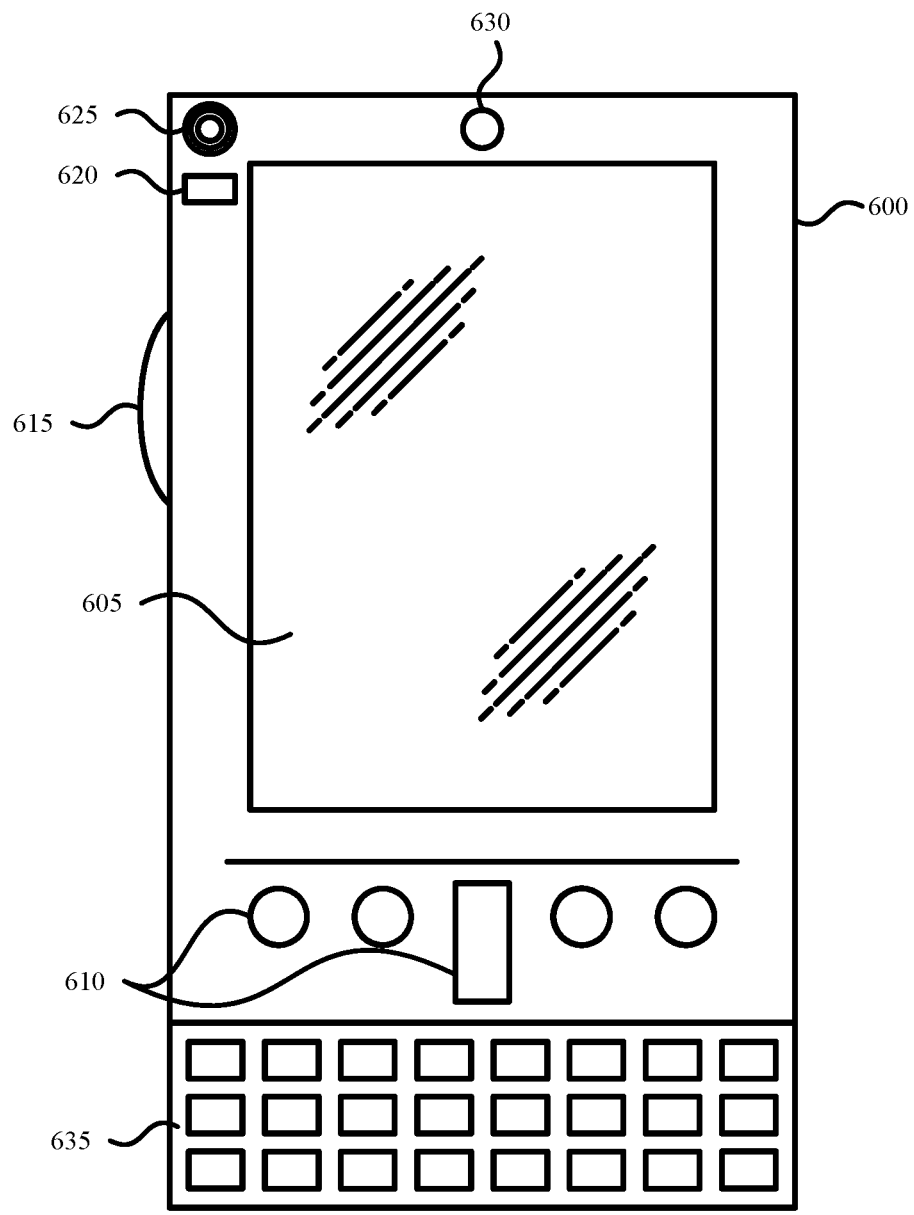
FIGS. 6A and 6B are simplified block diagrams of a mobile computing device with which aspects of the present disclosure may be practiced.
Figure 6B:
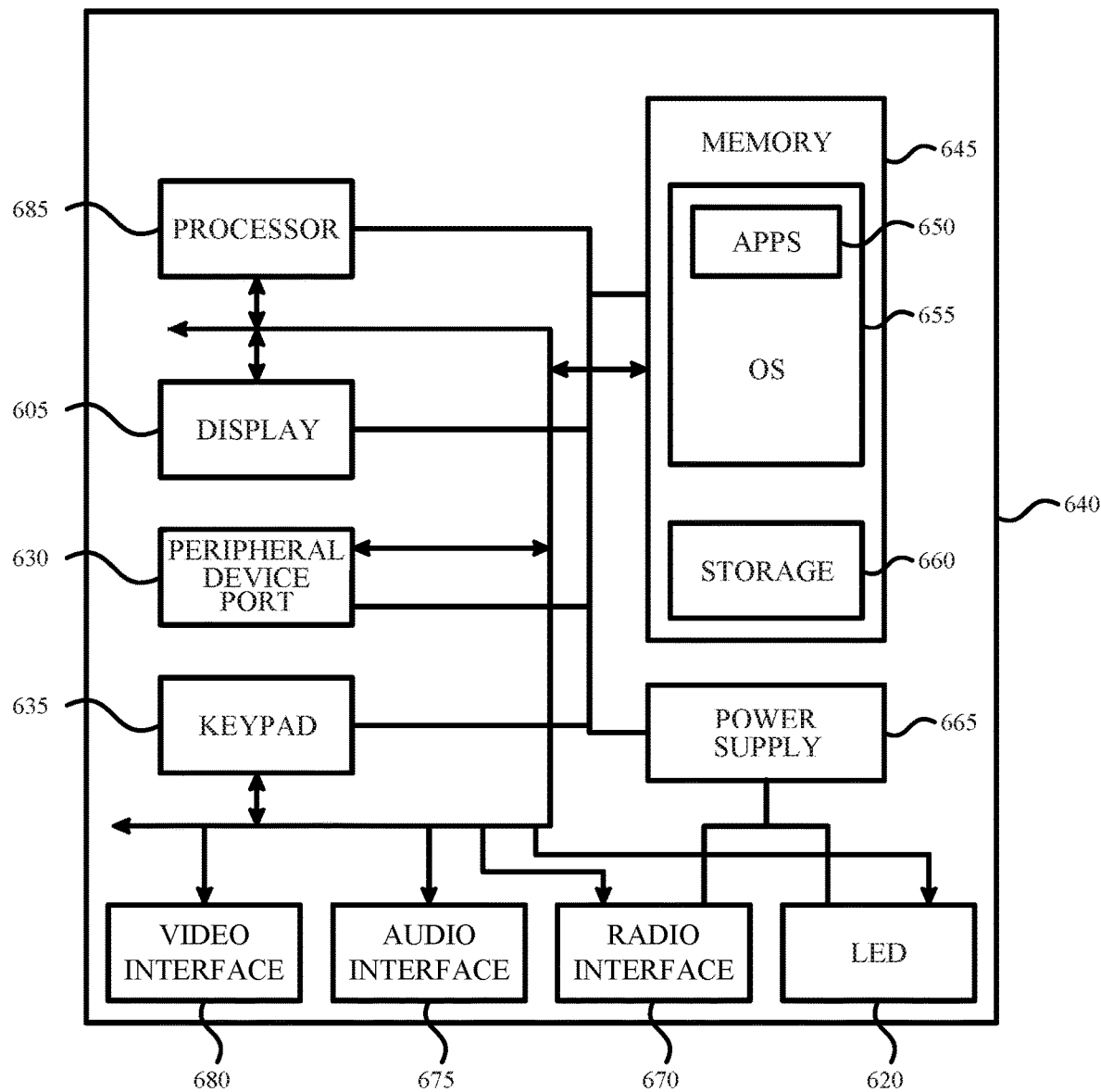

FIGS. 6A and 6B illustrate a mobile electronic device 600, for example, a mobile telephone, a smart phone, wearable computer (such as a smart watch), a tablet computer, a laptop computer, and the like, with which examples of the disclosure may be practiced. With reference to FIG. 6A, one aspect of a mobile electronic device 600 for implementing the aspects is illustrated.

In a basic configuration, the mobile electronic device 600 is a handheld computer having both input elements and output elements. The mobile electronic device 600 typically includes a display 605 that provides a user interface that enables an individual to select one or more tokenization settings and one or more input buttons 610 that allow the user to enter information into the mobile electronic device 600. The display 605 of the mobile electronic device 600 may also function as an input device (e.g., a display that accepts touch and/or force input).

If included, an optional side input element 615 allows further user input. The side input element 615 may be a rotary switch, a button, or any other type of manual input element. In alternative aspects, mobile electronic device 600 may incorporate more or less input elements. For example, the display 605 may not be a touch screen in some examples. In yet another alternative embodiment, the mobile electronic device 600 is a portable phone system, such as a cellular phone. The mobile electronic device 600 may also include an optional keypad 635. Optional keypad 635 may be a physical keypad or a "soft" keypad generated on the touch screen display.

In various examples, the output elements include the display 605 for showing a graphical user interface (GUI), a visual indicator 620 (e.g., a light emitting diode), and/or an audio transducer 625 (e.g., a speaker). In some aspects, the mobile electronic device 600 incorporates a vibration transducer for providing the user with tactile feedback. In yet another aspect, the mobile electronic device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile electronic device 600. That is, the mobile electronic device 600 can incorporate a system (e.g., an architecture) 640 to implement some aspects. In one embodiment, the system 640 is implemented as a "smart phone" capable of running one or more applications (e.g., browser, e-mail, calendaring, contact managers, messaging clients, games, media clients/players, content selection and sharing applications and so on). In some aspects, the system 640 is integrated as an electronic device, such as an integrated personal digital assistant (PDA) and wireless phone.

One or more application programs 650 may be loaded into the memory 645 and run on or in association with the operating system 655. Examples of the application programs include phone dialer programs, e-mail programs, personal information management (PIM) programs, word processing programs, spreadsheet programs, Internet browser programs, messaging programs, and so forth.

The system 640 also includes a non-volatile storage area 660 within the memory 645. The non-volatile storage area 660 may be used to store persistent information that should not be lost if the system 640 is powered down.

The application programs 650 may use and store information in the non-volatile storage area 660, such as email or other messages used by an email application, and the like. A synchronization application (not shown) also resides on the system 640 and is programmed to interact with a corresponding synchronization application resident on a host computer to keep the information stored in the non-volatile storage area 660 synchronized with corresponding information stored at the host computer.

The system 640 has a power supply 665, which may be implemented as one or more batteries. The power supply 665 may further include an external power source, such as an AC adapter or a powered docking cradle that supplements or recharges the batteries.

The system 640 may also include a radio interface layer 670 that performs the function of transmitting and receiving radio frequency communications. The radio interface layer 670 facilitates wireless connectivity between the system 640 and the "outside world," via a communications carrier or service provider. Transmissions to and from the radio interface layer 670 are conducted under control of the operating system 655. In other words, communications received by the radio interface layer 670 may be disseminated to the application programs 650 via the operating system 655, and vice versa.

The visual indicator 620 may be used to provide visual notifications, and/or an audio interface 675 may be used for producing audible notifications via an audio transducer (e.g., audio transducer 625 illustrated in FIG. 6A). In the illustrated embodiment, the visual indicator 620 is a light emitting diode (LED) and the audio transducer 625 may be a speaker. These devices may be directly coupled to the power supply 665 so that when activated, they remain on for a duration dictated by the notification mechanism even though the processor 685 and other components might shut down for conserving battery power. The LED may be programmed to remain on indefinitely until the user takes action to indicate the powered-on status of the device.

The audio interface 675 is used to provide audible signals to and receive audible signals from the user (e.g., voice input such as described above). For example, in addition to being coupled to the audio transducer 625, the audio interface 675 may also be coupled to a microphone to receive audible input, such as to facilitate a telephone conversation. In accordance with examples of the present disclosure, the microphone may also serve as an audio sensor to facilitate control of notifications, as will be described below.

The system 640 may further include a video interface 680 that enables an operation of peripheral device 630 (e.g., on-board camera) to record still images, video stream, and the like.

A mobile electronic device 600 implementing the system 640 may have additional features or functionality. For example, the mobile electronic device 600 may also include additional data storage devices (removable and/or non-removable) such as, magnetic disks, optical disks, or tape. Such additional storage is illustrated in FIG. 6B by the non-volatile storage area 660.

Data/information generated or captured by the mobile electronic device 600 and stored via the system 640 may be stored locally on the mobile electronic device 600, as described above, or the data may be stored on any number of storage media that may be accessed by the device via the radio interface layer 670 or via a wired connection between the mobile electronic device 600 and a separate electronic device associated with the mobile electronic device 600, for example, a server computer in a distributed computing network, such as the Internet. As should be appreciated such data/information may be accessed via the mobile electronic device 600 via the radio interface layer 670 or via a distributed computing network. Similarly, such data/information may be readily transferred between electronic devices for storage and use according to well-known data/information transfer and storage means, including electronic mail and collaborative data/information sharing systems.

In examples, one or both of device 110 and the content management system 140 (or its various subsystems) may comprise a system as shown in FIG. 6A and FIG. 6B. As should be appreciated, FIG. 6A and FIG. 6B are described for purposes of illustrating the present methods and systems and is not intended to limit the disclosure to a particular sequence of steps or a particular combination of hardware or software components.

Figure 7:
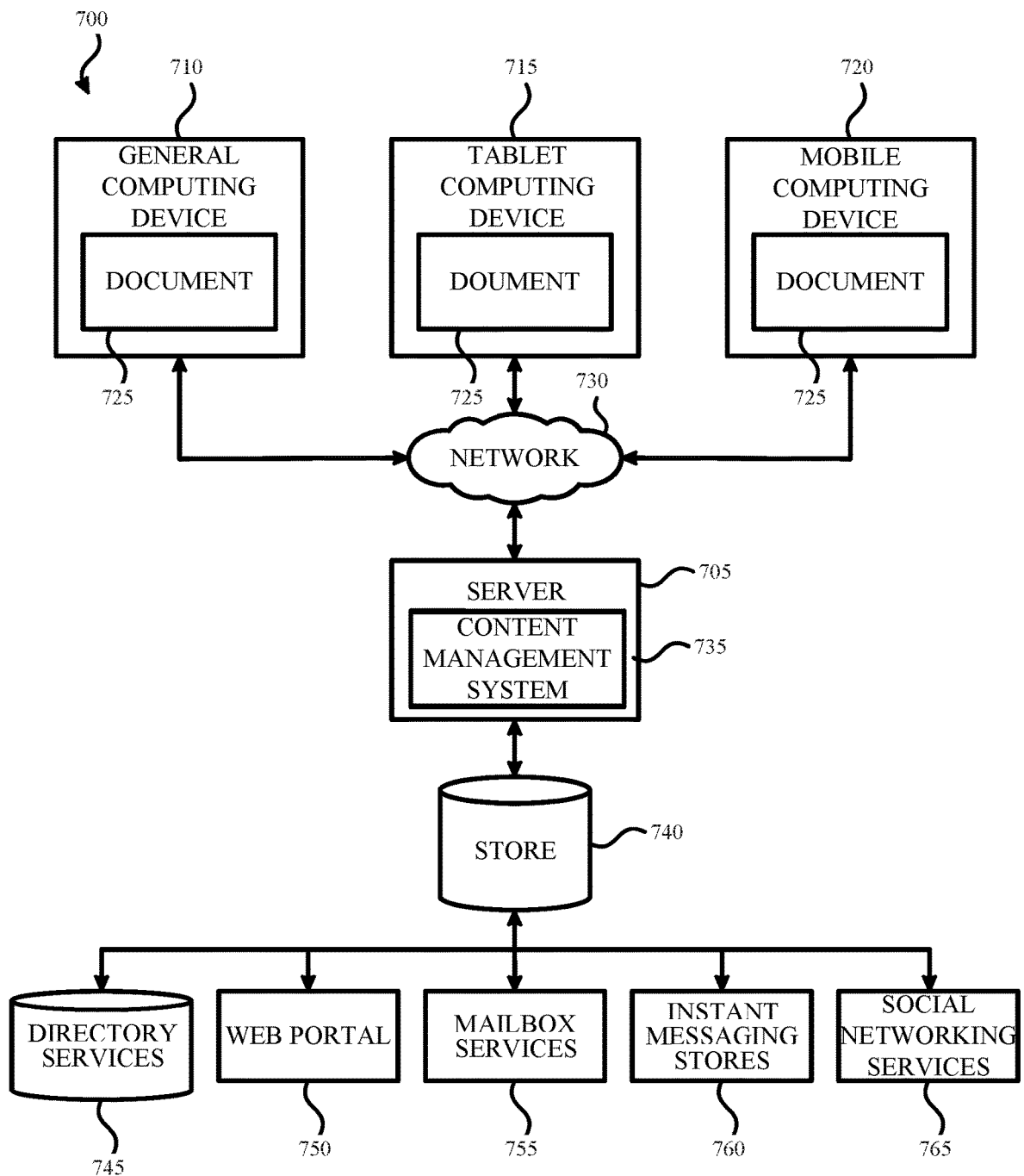
FIG. 7 is a simplified block diagram of a distributed computing system in which aspects of the present disclosure may be practiced.

FIG. 7 illustrates one aspect of the architecture of a system 700 that may be used to tokenize and store documents such as described herein. The system 700 may include a general computing device 710 (e.g., personal computer), a tablet computing device 715, or mobile computing device 720, as described above. Each of these devices may be used to edit a document 725, add content to a document 725 and/or provide input to select one or more tokenization settings for the document 725.

In some aspects, each of the general computing device 710, the tablet computing device 715, or the mobile computing device 720 may receive various other types of information or content that is stored by or transmitted from a directory service 745, a web portal 750, mailbox services 755, instant messaging stores 760, or social networking services 765.

In aspects, the document 725 may be provided, through network 730, to content management system 735 hosted on a server 705.

By way of example, the aspects described above may be embodied in a general computing device 710, a tablet computing device 715 and/or a mobile computing device 720. Any of these examples of the computing devices may obtain content from or provide data to the store 740.

As should be appreciated, FIG. 7 is described for purposes of illustrating the present methods and systems and is not intended to limit the disclosure to a particular sequence of steps or a particular combination of hardware or software components.

Figure 8:
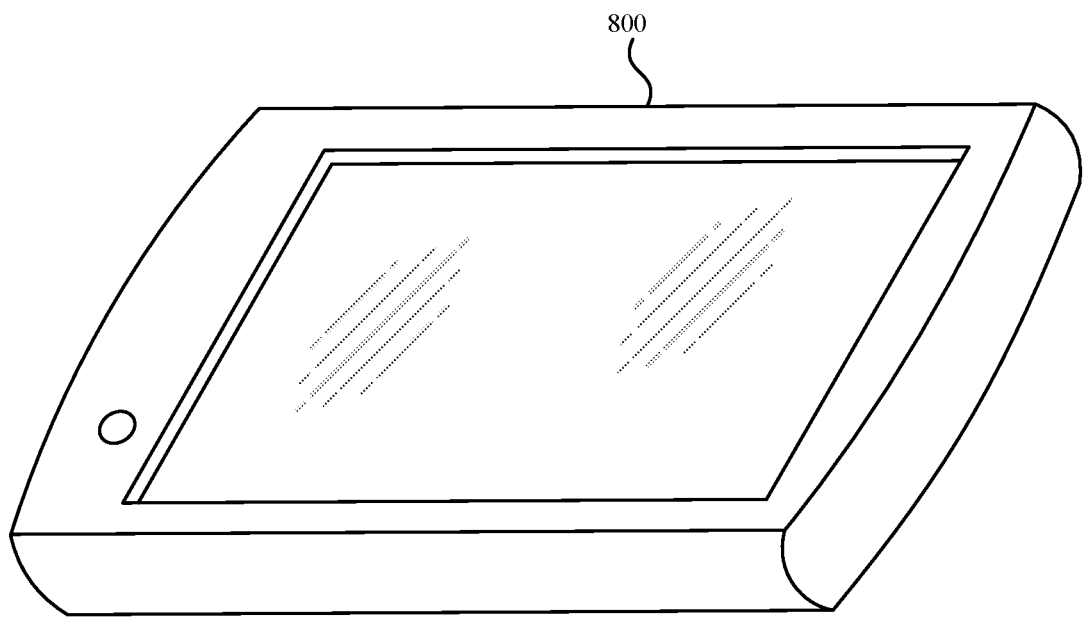
FIG. 8 illustrates a tablet computing device for executing one or more aspects of the present disclosure.

FIG. 8 illustrates an example tablet electronic device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet.

User interfaces and information of various types may be displayed via on-board electronic device displays or via remote display units associated with one or more electronic devices. For example, user interfaces and information of various types may be displayed and interacted with on a wall surface onto which user interfaces and information of various types are projected. Interaction with the multitude of computing systems with which examples of the invention may be practiced include, keystroke entry, touch screen entry, voice or other audio entry, gesture entry where an associated electronic device is equipped with detection (e.g., camera) functionality for capturing and interpreting user gestures for controlling the functionality of the electronic device, and the like.

As should be appreciated, the figures described herein are described for purposes of illustrating the present methods and systems and is not intended to limit the disclosure to a particular sequence of steps or a particular combination of hardware or software components.

Examples of the present disclosure describe a method for tokenizing a document, comprising: receiving a document; analyzing the document to determine one or more languages of text contained within the document; determining one or more subsections of the document based, at least in part, on the determined one or more languages; tokenizing each of the one or more subsections based, at least in part, on the determined one or more languages; and storing the tokenized document in a content management system. In some examples, the method further comprises annotating each subsection to indicate the determined one or more languages. In other examples, the method further comprises tokenizing one or more metadata fields associated with the document. In other examples, the method further comprises receiving input to indicate that the document is dividable into subsections. In other examples, the method further comprises receiving input to indicate that a second tokenization setting is to be applied to the document. In other examples, the method further comprises applying the second tokenization setting to the document. In some examples, the second tokenization setting causes one or more substrings associated with the document to be tokenized. In some examples, the one or more substrings are tokenized in a language neutral manner.

The present disclosure also describes a system, comprising: one or more processors; and a memory coupled to the one or more processors and storing instructions which, when executed by the one or more processors, causes the one or more processors to perform a method, comprising: receiving a document to be stored in a content management system; receiving input that indicates one or more of a plurality of different tokenization settings to be applied to content associated with the document, wherein the plurality of different tokenization settings comprise: a first setting that tokenizes a subpart of content associated with the document; a second setting that tokenizes the content associated with the document in a language neutral manner; and a third setting that tokenizes subsections of the content associated with the document in a language specific manner; tokenizing the content associated with the document based, at least in part, on the received input; and storing the tokenized document in the content management system. In other examples, the memory also stores instructions for detecting one or more subsections in the document when the third setting is selected. In other examples, the memory also stores instructions for annotating the one or more subsections to indicate a language of the one or more subsections. In other examples, the memory also stores instructions for tokenizing each of the one or more subsections based on the language of the one or more subsections. In some examples, the content associated with the document is a metadata field associated with the document. In other examples, the memory also stores instructions for determining a language of the content associated with the document. In other examples, a fourth may indicate that the content associated with the document will not be tokenized. In other examples, the memory also stores instructions for tokenizing the content associated with the document in a language neutral manner when the first setting is selected.

Also disclosed is a method, comprising: receiving a document; receiving input that indicates one or more of a plurality of different tokenization settings to be applied to content associated with the document, wherein the plurality of different tokenization settings comprise: a first setting that tokenizes a subpart of content associated with the document; a second setting that tokenizes the content associated with the document in a language neutral manner; and a third setting that tokenizes subsections of the content associated with the document in a language specific manner; tokenizing the content associated with the document based, at least in part, on the received input; storing the tokenized document in the content management system; and returning the document in response to a received query, wherein the query is tokenized using at least one of the plurality of different tokenization settings. In other examples, each of the one or more subsections are annotated with a language indicator when the third setting is selected. In other examples, the method comprises tokenizing each of the one or more subsections based on the language of the one or more subsections. In other examples, the content associated with the document is a metadata field associated with the document.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure.

The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. For example, the operations provided in the various methods described above may be performed in any order and are not limited to the order described.

Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for tokenizing a document, comprising:
receiving a document;
receiving user input to indicate that a tokenization setting is to be applied to the document;
applying the tokenization setting to the document;
determining based on the tokenization setting that the document includes text in a first language and text in a second language;
determining that a first plurality of document subsections are in the first language and a second plurality of document subsections are in the second language
identifying a first language specific tokenization scheme associated with the first language and a second language specific tokenization scheme associated with the second language;
tokenizing each of the first plurality of document subsections using the first language-specific tokenization scheme;
tokenizing each of the second plurality of document subsections using the second language-specific tokenization scheme; and
storing the tokenized document in a content management system.

2. The method of claim 1, further comprising annotating subsection to indicate the determined language.

3. The method of claim 1, wherein a first token of plurality of tokens is a substring of a second token of the plurality of tokens.

4. The method of claim 1, wherein the user input indicates that the document is dividable into subsections.

5. The method of claim 1, wherein the tokenization setting causes one or more substrings associated with the document to be tokenized to form the plurality of tokens.

6. The method of claim 5, further comprising receiving input to indicate that a second tokenization setting is to be applied to the document.

7. A system, comprising:
one or more processors; and
a memory coupled to the one or more processors and storing instructions which, when executed by the one or more processors, causes the one or more processors to perform a method, comprising:
receiving a document;
receiving user input that indicates one or more different tokenization settings to be applied by a tokenizer to content associated with the document, wherein the one or more different tokenization settings comprise:
a first setting that tokenizes a subpart of the content associated with the document;
a second setting that tokenizes a metadata content associated with the document in a language neutral manner; and
a third setting that tokenizes different subsections of the content associated with the document in different languages using language specific tokenizers that correspond to the different languages;
using the tokenizer to tokenize the content associated with the document based, at least in part, on the received user input; and
storing the tokenized document in the content management system.

8. The system of claim 7, further comprising instructions for detecting one or more subsections in the document when the third setting is selected.

9. The system of claim 8, further comprising instructions for annotating the one or more subsections to indicate a language of the one or more subsections.

10. The system of claim 9, further comprising instructions for tokenizing each of the one or more subsections based on the language of the one or more subsections.

11. The system of claim 7, further comprising instructions for tokenizing a query based on tokens stored in a document management system.

12. The system of claim 7, further comprising instructions for determining a language of the content associated with the document.

13. The system of claim 7, further comprising a fourth setting that indicates that the content associated with the document will not be tokenized.

14. The system of claim 7, further comprising instructions for tokenizing the content associated with the document in a language neutral manner when the first setting is selected.

15. A computer-implemented method, comprising:
receiving a document;
receiving user input that indicates one or more different tokenization settings to be applied by a tokenizer to content associated with the document, wherein the one or more different tokenization settings comprise:
a first setting that tokenizes a subpart of the content associated with the document;
a second setting that tokenizes a metadata content associated with the document in a language neutral manner; and
a third setting that tokenizes different subsections of the content associated with the document in different languages using language specific tokenizers that correspond to the different languages;
using the tokenizer to tokenize the content associated with the document based, at least in part, on the received user input;
storing the tokenized document in the content management system; and
returning the document in response to a received query, wherein the query is tokenized using at least one of the plurality of different tokenization settings.

16. The method of claim 15, further comprising annotating a subsection with a language indicator when the third setting is selected.

17. The method of claim 16, further comprising tokenizing the subsection based on the language of the one or more subsections.

18. The method of claim 15, further comprising tokenizing the content associated with the document in a language neutral manner when the first setting is selected.

19. The method of claim 1, further comprising receiving user input to indicate a second setting that tokenizes a metadata content associated with the document in a language neutral manner.

20. The method of claim 1, further comprising receiving user input to indicate a second setting that tokenizes a subpart of the content associated with the document.

* * * * *